(12) United States Patent
Yamasaki et al.

(10) Patent No.: US 11,106,243 B2
(45) Date of Patent: Aug. 31, 2021

(54) DISPLAY SCREEN CONFIGURATION

(71) Applicant: LENOVO (Singapore) PTE. LTD., New Tech Park (SG)

(72) Inventors: Seiji Yamasaki, Yokohama (JP); Yasumichi Tsukamoto, Yokohama (JP); Tatsumi Nagasawa, Yokohama (JP); Yuichi Shigematsu, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/601,317

(22) Filed: Oct. 14, 2019

(65) Prior Publication Data

US 2020/0117242 A1     Apr. 16, 2020

(30) Foreign Application Priority Data

Oct. 12, 2018  (JP) .............................. JP2018-193528

(51) Int. Cl.
*G06F 1/16* (2006.01)
*G06F 3/0488* (2013.01)
*G06F 3/041* (2006.01)

(52) U.S. Cl.
CPC .......... *G06F 1/1643* (2013.01); *G06F 3/0412* (2013.01); *G06F 3/0488* (2013.01)

(58) Field of Classification Search
CPC ...... G06F 1/1613; G06F 1/1643; G06F 1/165; G06F 1/1652; G06F 3/0412; G06F 3/0488; G06F 3/04886
See application file for complete search history.

(56) References Cited

U.S. PATENT DOCUMENTS

| | | | |
|---|---|---|---|
| 2005/0185364 A1* | 8/2005 | Bell ..................... | G06F 1/1632 361/679.41 |
| 2015/0227377 A1* | 8/2015 | Park ..................... | G06F 1/1616 713/2 |
| 2019/0129473 A1* | 5/2019 | Hu ....................... | G06F 3/04886 |

FOREIGN PATENT DOCUMENTS

| JP | 2001117668 A | 4/2001 |
|---|---|---|
| JP | 2003167525 A | 6/2003 |
| JP | 2008015453 A | 1/2008 |
| JP | 2010061494 A | 3/2010 |
| JP | 2011141607 A | 7/2011 |

* cited by examiner

*Primary Examiner* — Nelson M Rosario
(74) *Attorney, Agent, or Firm* — Kunzler Bean & Adamson

(57) ABSTRACT

An apparatus is disclosed. The apparatus includes a first display unit; a touch screen including a second display unit and a detection unit; and a start-up control unit that displays index information on the touch screen, and displays a screen configuration on the first display unit. Another apparatus is disclosed. The apparatus includes a first chassis; a second chassis coupled to the first chassis; a first display unit; and a touch screen including a second display unit, and a detection unit that detects a touch operation made on the second display unit. A control method for an apparatus that includes a first display unit and a touch screen including a second display unit and a detection unit is disclosed. The control method includes displaying index information on the second display unit; and displaying, a screen configuration corresponding to an operation area in which a touch operation is performed.

20 Claims, 9 Drawing Sheets

DISPLAY SCREEN CONFIGURATION

CROSS-REFERENCE TO RELATED APPLICATIONS

This patent application claims priority to Japanese Patent Application No. JP2018-193528 filed on 12 Oct. 2018 for Seiji Yamasaki, Yasumichi Tsukamoto, Tatsumi Nagasawa, and Yuichi Shigematsu, the entire contents of which are incorporated herein by reference for all purposes.

FIELD

The present invention relates to an information processing apparatus and a control method.

BACKGROUND

Recently, in information processing apparatuses such as laptop PCs (Personal Computers), displays are often stopped in a low-power consumption mode such as modern standby in Windows 10 (Windows is a registered trademark).

BRIEF SUMMARY

An information processing apparatus comprises a first display unit; a touch screen comprising a second display unit that is visible when the first display unit is not visible, and a detection unit that detects a touch operation made in an operation area on the touch screen; and a start-up control unit that displays index information on the touch screen, and displays a screen configuration on the first display unit that corresponds to the operation area of the touch screen after the touch operation and an operation to make the first display unit visible are detected.

An information processing apparatus comprises a first chassis; a second chassis that is rotatably coupled to the first chassis through a hinge provided near a first end the first chassis; a first display unit; and a touch screen that comprises a second display unit that is visible in a configuration of the information processing apparatus wherein the first chassis overlaps the second chassis, and the first display unit faces the second chassis, the first display unit not being visible, and a detection unit that detects a touch operation made on the second display unit.

A control method for an information processing apparatus, wherein the information processing apparatus includes a first display unit, and a touch screen that comprises a second display unit that is visible when the first display unit is not visible, and a detection unit that detects a touch operation on the second display unit, comprises displaying index information on the second display unit in a state of the information processing apparatus wherein the first display unit is not visible; and displaying, on the first display unit, a screen configuration corresponding to an operation area in which the touch operation is performed as a result of detecting the touch operation and detecting an operation that makes the first display unit visible.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
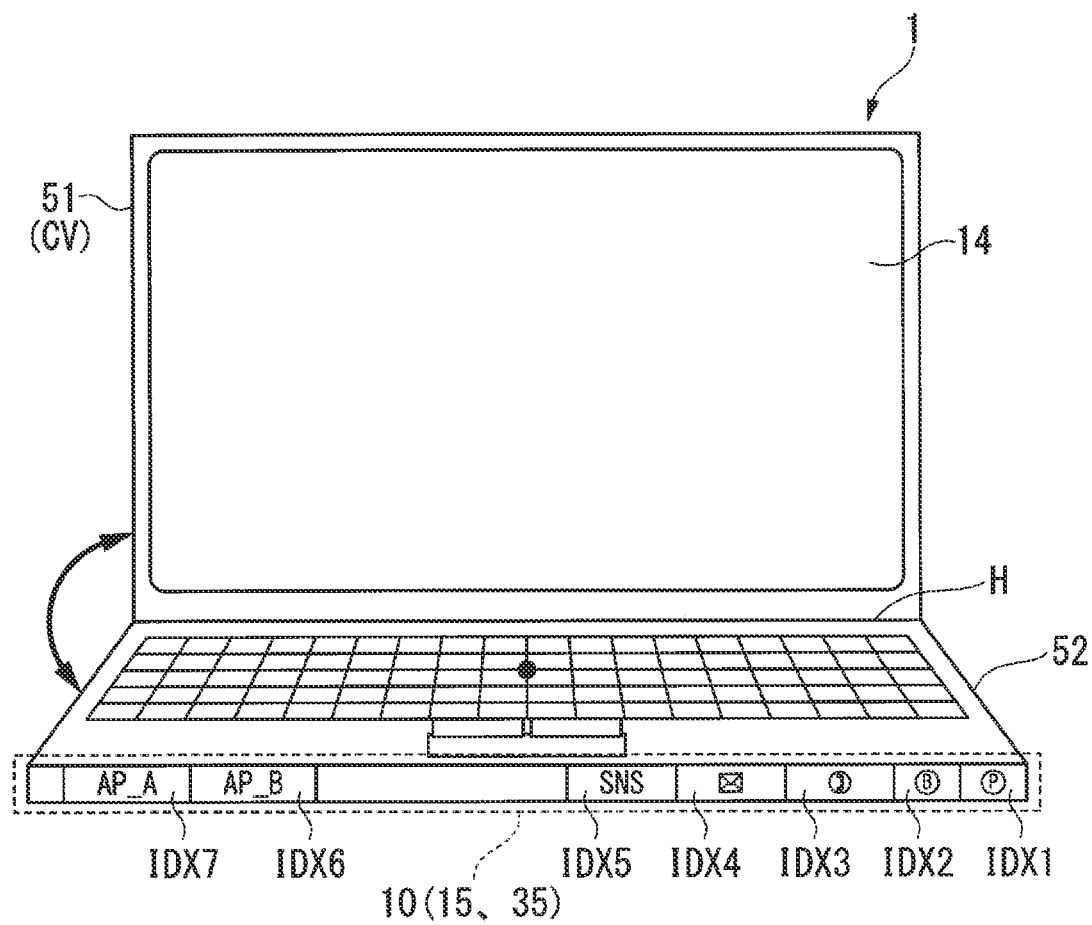
FIG. 1A is an external view illustrating an example of a laptop PC where a cover of the laptop PC is open, according to a first embodiment.

When a conventional information processing apparatus returns from a low-power consumption mode to a normal operating state, the state of such an apparatus returns to the normal operating state by displaying what was on the screen just before the display was turned off. Therefore, for example, when the conventional information processing apparatus is used for a private use (since a display screen used for private use may be displayed even if the state is returned to the normal operating state for a business use) user-friendliness may be sacrificed.

The present invention has been made to solve the above problem and provide an information processing apparatus and a control method, capable of improving user-friendliness.

An information processing apparatus according to one aspect of the present invention includes: a first display unit which displays a main screen; a touch screen having a second display unit visible and displayable in a state where the display of the first display unit is not visible, and a detection unit which detects a touch operation on the second display unit with an operation medium; and a start-up control unit which displays index information on the second display unit in the state where the display of the first display unit is not visible, and which, when the touch operation is detected and an operation to make the display of the first display unit visible is executed, starts the display of the first display unit to display, on the main screen, a screen corresponding to a touch operation area in which the touch operation was performed on the second display unit.

The information processing apparatus according to the one aspect of the present invention may further include: a first chassis equipped with the first display unit; and a second chassis connected rotatably through a hinge provided on one end side of the first chassis, wherein the touch screen is provided on an edge of either one of the first chassis and the second chassis different from the other chassis that is subjected to a user's rotation operation when the first chassis and the second chassis are relatively rotated to change from a state, where the first chassis and the second chassis are overlapped with each other so that a display surface of the first display unit will face the second chassis to make the display of the first display unit not visible, to a state where the display of the first display unit is visible.

The information processing apparatus according to the one aspect of the present invention may further include: a first chassis equipped with the first display unit; and a second chassis connected rotatably through a hinge provided on one end side of the first chassis, wherein the touch screen is provided on an edge of either one of the first chassis and the second chassis that is subjected to a user's rotation operation when the first chassis and the second chassis are relatively rotated to change from a state, where the first chassis and the second chassis are overlapped with each other so that a display surface of the first display unit will face the second chassis to make the display of the first display unit not visible, to a state where the display of the first display unit is visible.

The information processing apparatus according to the one aspect of the present invention may be such that the edge on which the touch screen is provided is an end face to face in a direction perpendicular to a direction of the rotation axis about which the first chassis and the second chassis are rotated.

The information processing apparatus according to the one aspect of the present invention may be such that the edge on which the touch screen is provided is an end face to face in a direction parallel to a direction of the rotation axis about which the first chassis and the second chassis are rotated.

The information processing apparatus according to the one aspect of the present invention may be such that the edge on which the touch screen is provided is one edge of the first chassis, opposite to the other edge along which the hinge is provide, on a face opposite to a face on which the display surface of the first display unit is formed.

The information processing apparatus according to the one aspect of the present invention may be such that the start-up control unit displays plural pieces of index information having at least first index information and second index information as the index information, and when the touch operation area is an area corresponding to the first index information, the start-up control unit starts the display of the first display unit to display a desktop screen on which applications running before the display of the first display unit is made not visible are minimized, or when the touch operation area is an area corresponding to the second index information, the start-up control unit starts the display of the first display unit to display a display screen of the applications running before the display of the first display unit is made not visible.

The information processing apparatus according to the one aspect of the present invention may further include a storage unit which stores an application corresponding to each of the plural pieces of index information, wherein when the touch operation area is an area corresponding to the index information, the start-up control unit minimizes all but the application corresponding to the index information among applications running before the display of the first display unit was made not visible to start the display of the first display unit.

The information processing apparatus according to the one aspect of the present invention may be such that the start-up control unit displays, as the index information, notification information indicating that a predetermined event to be notified at least to a user has occurred, and when the touch operation area is an area corresponding to the notification information, the start-up control unit starts the display of the first display unit to display a display screen of an application related to the notification information.

The information processing apparatus according to the one aspect of the present invention may be such that the start-up control unit displays, as the index information, information indicative of an application, and when the touch operation area is an area corresponding to the information indicative of the application, the start-up control unit starts the display of the first display unit to display a display screen of the application.

The information processing apparatus according to the one aspect of the present invention may be such that the first display unit and the second display unit are different display areas of one display device.

An information processing apparatus according to another aspect of the present invention includes: a first chassis equipped with a first display unit which displays a main screen; a second chassis connected rotatably through a hinge provided on one end side of the first chassis; and a touch screen having a second display unit visible and displayable in a state where the first chassis and the second chassis are overlapped with each other so that a display surface of the first display unit will face the second chassis to make the display of the first display unit not visible, and a detection unit which detects a touch operation on the second display unit with an operation medium, wherein the touch screen is provided on one edge opposite to the other edge, along which the hinge is provided, of either one of the first chassis and the second chassis.

The information processing apparatus according to the other aspect of the present invention may be such that the edge on which the touch screen is provided is an end face to face in a direction perpendicular to a direction of the rotation axis about which the first chassis and the second chassis are rotated.

The information processing apparatus according to the other aspect of the present invention may be such that the edge on which the touch screen is provided is an end face to face in a direction parallel to a direction of the rotation axis about which the first chassis and the second chassis are rotated.

The information processing apparatus according to the other aspect of the present invention may be such that the edge on which the touch screen is provided is an edge of one face of the first chassis opposite to the other face on which the display surface of the first display unit is formed.

A control method according to one aspect of the present invention is a control method for an information processing apparatus including a first display unit which displays a main screen, and a touch screen having a second display unit visible and displayable in a state where the display of the first display unit is not visible, and a detection unit which detects a touch operation on the second display unit with an operation medium, the control method including: a display step of causing the second display unit to display index information in the state where the display of the first display unit is not visible; and a start-up control step in which, when the touch operation is detected and an operation to make the display of the first display unit visible is executed, a start-up control unit starts the display of the first display unit to display, on the main screen, a screen corresponding to a touch operation area in which the touch operation was performed on the second display unit.

The above aspects of the present invention can improve user-friendliness.

An information processing apparatus and a display control method according to one embodiment of the present invention will be described below with reference to the accompanying drawings.

First Embodiment

Figure 1B:
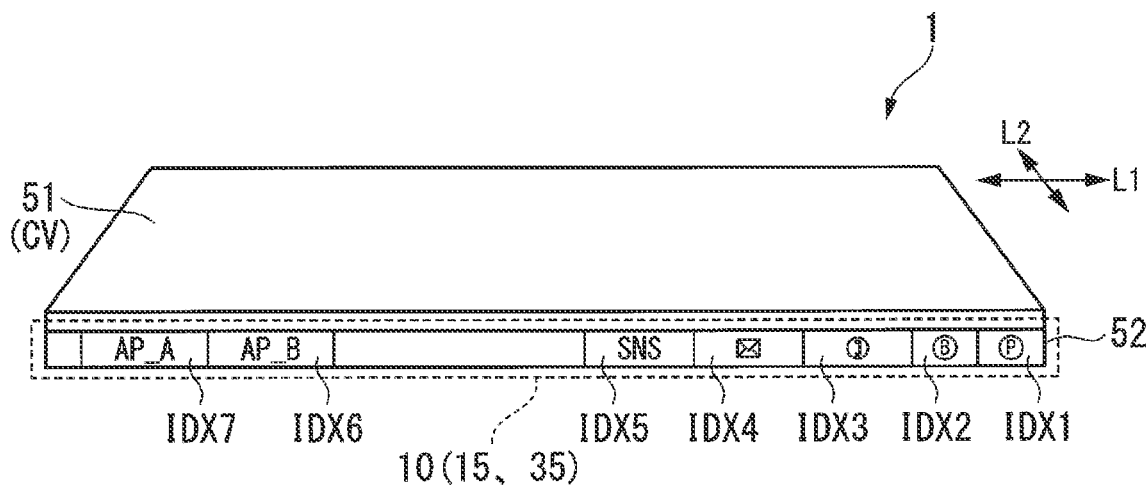
FIG. 1B is an external view illustrating an example of a laptop PC where a cover of the laptop PC is closed, according to a first embodiment.
Figure 2:
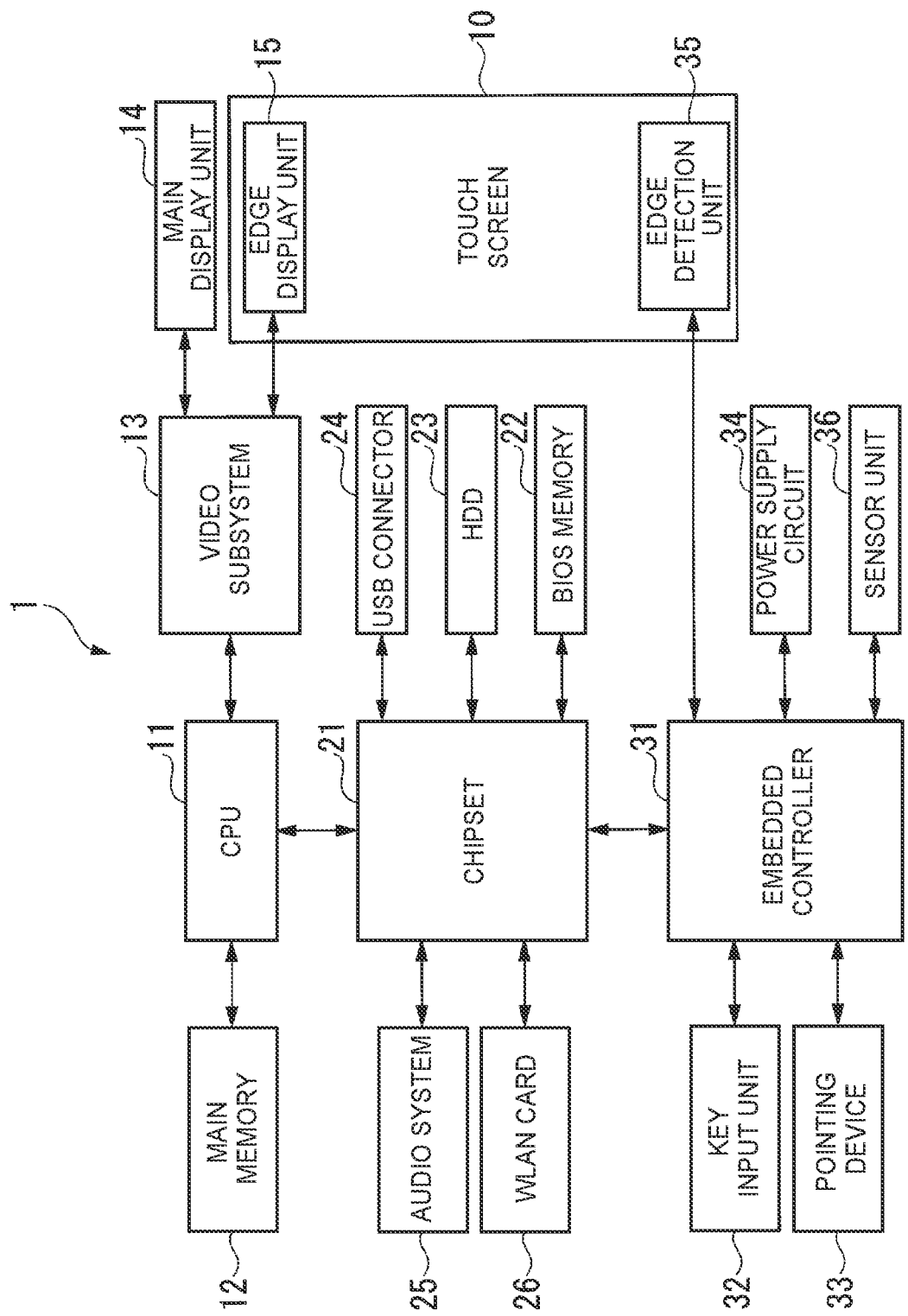
FIG. 2 is a diagram illustrating an example of a main hardware configuration of the laptop PC according to the first embodiment.

FIGS. 1A and 1B depict an external view illustrating an example of a laptop PC 1 (laptop personal computer) according to a first embodiment. Further, FIG. 2 is a diagram illustrating an example of a main hardware configuration of the laptop PC 1 according to the first embodiment. Note that the laptop PC 1 will be described in the embodiment as an example of the information processing apparatus.

As illustrated in FIG. 1A and FIG. 1B, the laptop PC 1 is a laptop personal computer including a main display unit 14 for displaying a main screen and a touch screen 10. FIG. 1A illustrates a state where a cover CV of the laptop PC 1 according to the embodiment is open to make the display of the main display unit 14 visible. FIG. 1B illustrates a state where the cover CV of the laptop PC 1 according to the embodiment is closed to cover the display of the main display unit 14.

The laptop PC 1 includes a first chassis 51 equipped with the main display unit 14, and a second chassis 52 connected rotatably through a hinge H provided on one end side of the first chassis 51. The first chassis 51 and the second chassis 52 are so rotated that the display of the main display unit 14 will be changed from a state where the display is not visible to the state where the display is visible. Here, the state where the display of the main display unit 14 is not visible means a state where the first chassis 51 and the second chassis 52 overlap each other to make the display surface of the main display unit 14 face the second chassis 52 (the state where the cover CV is closed). In the embodiment, description is made on condition that the rotation axis direction of the first chassis 51 and the second chassis 52 is denoted by direction L1 and a direction perpendicular to the rotation axis direction is denoted by direction L2.

The touch screen 10 is arranged on an edge of a chassis of the apparatus (laptop PC 1) to have an edge display unit 15 and an edge detection unit 35. For example, the touch screen 10 is provided on an edge of one chassis different from the side between the first chassis 51 (cover CV) rotated by a user and the second chassis 52 when the first chassis 51 and the second chassis 52 are relatively rotated. In the embodiment, as an example, the touch screen 10 is provided on an edge of the second chassis 52 (on a side face of the chassis). Here, the edge on which the touch screen 10 is provided is an end face to face in a direction (direction L2) perpendicular to the direction of the rotation axis (direction L1) about which the first chassis 51 and the second chassis 52 are rotated.

The edge display unit 15 (an example of a second display unit) is, for example, an organic EL (Electro-Luminescence) display or the like, which is arranged on the side face of the chassis of the laptop PC 1. The edge display unit 15 is a display unit that is visible and displayable in a state where the display of the main display unit 14 is not visible (for example, the state where the openable cover CV is closed). The edge display unit 15 displays a variety of index information, for example, in the state where the cover CV is closed. Note that the details of index information will be described later.

The edge detection unit 35 (an example of a detection unit) is, for example, an input device such as a touch panel, which is arranged to be overlapped with the edge display unit 15. The edge detection unit 35 detects a touch operation on the edge display unit 15 with an operation medium. In the following description of the embodiment, a touch of a user's finger on the edge detection unit 35 (edge display unit 15) may be called "touch," and a poke (push like a poke) at a specified part of the edge detection unit 35 (specified display part of the edge display unit 15) with a user's finger may be called "tap." "Touch" and "tap" are included in the touch operations. Further, the user's finger, a touch pen, and the like are included in the operation media.

Further, as illustrated in FIG. 2, the laptop PC 1 includes the touch screen 10, a CPU 11, a main memory 12, a video subsystem 13, the main display unit 14, a chipset 21, a BIOS memory 22, an HDD 23, a USB connector 24, an audio system 25, a WLAN card 26, an embedded controller 31, a key input unit 32, a pointing device 33, a power supply circuit 34, and a sensor unit 36.

The CPU (Central Processing Unit) 11 executes various kinds of operation processing by program control to control the entire laptop PC 1.

The main memory 12 is a writable memory used as reading areas of execution programs of the CPU 11 or working areas to which processing data of the execution programs are written. For example, the main memory 12 is configured to include a plurality of DRAM (Dynamic Random Access Memory) chips. The execution programs include an OS (Operating System), various device drivers for hardware operating peripheral devices, various services/utilities, application programs, and the like.

The video subsystem 13 is a subsystem for realizing functions associated with image display, which includes a video controller. This video controller processes a drawing instruction from the CPU 11 and writes processed drawing information into a video memory or reads this drawing information from the video memory and outputs it to the main display unit 14 and the edge display unit 15 as drawing data (display data).

The main display unit 14 (an example of a first display unit) is, for example, a liquid crystal display or an organic EL (Electro-Luminescence) display, which displays a display screen as a main screen based on the drawing data (display data) output from the video subsystem 13. Note that the main display unit 14 stops the display of the main screen in the state where the cover CV is closed as illustrated in FIG. 1B.

As described above, the edge display unit 15 is arranged on the side face of the chassis of the laptop PC 1 to display a variety of index information based on the drawing data (display data) output from the video subsystem 13.

The chipset 21 includes controllers, such as a USB (Universal Serial Bus), a serial ATA (AT Attachment), an SPI (Serial Peripheral Interface) bus, a PCI (Peripheral Component Interconnect) bus, a PCI-Express bus, and an LPC (Low Pin Count) bus, and a plurality of devices are connected to the chipset 21. In FIG. 2, the BIOS memory 22, the HDD 23, the USB connector 24, the audio system 25, the WLAN card 26, and the embedded controller 31 are connected to the chipset 21 as examples of the devices.

For example, the BIOS (Basic Input Output System) memory 22 is configured by an electrically rewritable non-volatile memory such as an EEPROM (Electrically Erasable Programmable Read Only Memory) or a flash ROM. The BIOS memory 22 stores the BIOS and system firmware for controlling the embedded controller 31, and the like.

The HDD (Hard Disk Drive) 23 (an example of a non-volatile storage device) stores the OS, various drivers, various services/utilities, application programs, and various data. The USB connector 24 is a connector for connecting peripheral devices using the USB.

The audio system 25 records, plays back, and outputs sound data.

The WLAN (Wireless Local Area Network) card 26 is connected to a network by wireless LAN to perform data communication. When receiving data from the network, for example, the WLAN card 26 generates an event trigger indicating that data are received.

The embedded controller 31 is a one-chip microcomputer which monitors and controls various devices (peripheral devices, sensors, and the like) irrespective of the system state of the laptop PC 1. Further, the embedded controller 31 has a power management function to control the power supply circuit 34. The embedded controller 31 is composed of a CPU, a ROM, a RAM, and the like, which are not illustrated, and equipped with multi-channel A/D input terminal and D/A output terminal, a timer, and a digital input/output terminal. For example, the key input unit 32, the pointing device 33, the power supply circuit 34, the edge detection unit 35, the sensor unit 36, and the like are connected to the embedded controller through these input/output terminals, and the embedded controller 31 controls the operation of these units.

The embedded controller 31 controls the power supply circuit 34 according to the system states (for example, S0 state to S5 state) defined in the ACPI (Advanced Configuration and Power Interface) specification. Here, the S0 state is the most active state, which is a normal operating state. Further, the S5 state is a shutdown state (power-off state) in which the power supply is turned off by software. Further, the S4 state is a hibernation state in which working contents are saved to the HDD 23 or the like.

The CPU 11 of the embodiment supports S0ix state as a low power consumption state capable of returning to the S0 state quickly, and the embedded controller 31 executes control of the power supply circuit 34 according to a standby mode (for example, modern standby mode) using this S0ix state. Here, the S0ix state is an extended state of the S0 state defined in the ACPI specification, that is, a state in which the power consumption is reduced to be lower than the S0 state.

In the embodiment, the modern standby mode is a mode in which the S0ix state described above and the S0 state where background processing is executed are switched and used in such a state that the display of the main display unit 14 is turned off (stopped). Here, the background processing is processing performed in the background, for example, without being accompanied by the display of the main display unit 14.

The key input unit 32 is an input device such as a keyboard or a touch panel, which accepts key input from a user. Further, the pointing device 33 is an input device such as a mouse or a touch pad, which mainly accepts the designation of a position on the display screen, the designation or selection of an operation target (object) such as an operation button.

The power supply circuit 34 includes a DC/DC converter, a charge/discharge unit, a battery unit, an AC/DC adapter, and the like to convert direct voltage supplied from the AC/DC adapter or the battery unit into a plurality of voltages required to operate the laptop PC 1. The power supply circuit 34 supplies power to each unit of the laptop PC 1 under the control of the embedded controller 31.

The sensor unit 36 performs various detections such as the temperature and state of each unit of the laptop PC 1. For example, the sensor unit 36 detects opening/closing of the cover CV.

Figure 3:
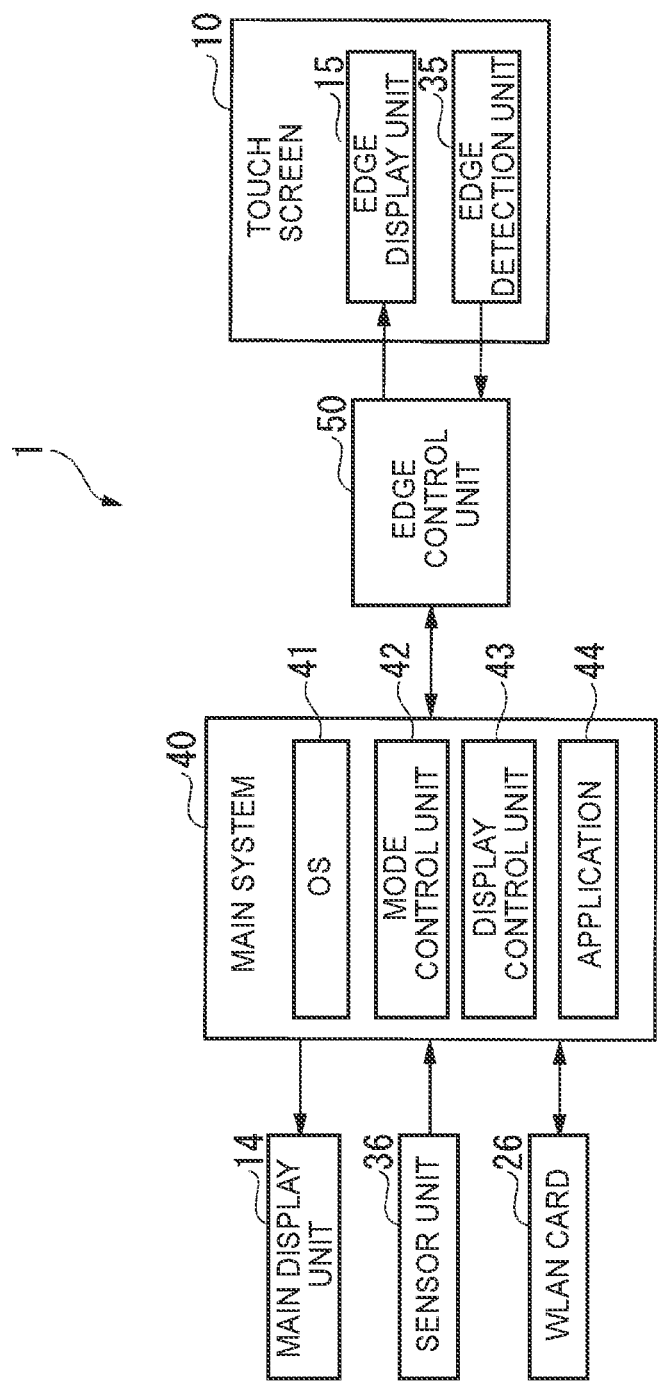
FIG. 3 is a block diagram illustrating an example of the functional configuration of the laptop PC according to the first embodiment.

Referring next to FIG. 3, the system of the laptop PC 1 according to the embodiment will be described.

FIG. 3 is a block diagram illustrating an example of the functional configuration of the laptop PC 1 according to the embodiment.

As illustrated in FIG. 3, the system of the laptop PC 1 includes a main system 40 and an edge control unit 50, which are implemented by software. Further, as main hardware of the embodiment, the system of the laptop PC 1 includes the main display unit 14, the touch screen 10 having the edge display unit 15 and the edge detection unit 35, the WLAN card 26, and the sensor unit 36.

In FIG. 3, the software is implemented by reading each program stored in the HDD 23 or the BIOS memory 22 into the main memory 12 and executing the program by the CPU 11.

The main system 40 includes an OS 41, a mode control unit 42, a display control unit 43, and applications 44.

The OS 41 is an operating system such as Windows (registered trademark) that provides operation information acquired from the key input unit 32 or the pointing device 33 to the applications 44 or other device drivers.

The mode control unit 42 controls the operation mode of the system of the laptop PC 1. For example, the mode control unit 42 stops the display of the main display unit 14 in response to a user's operation to make the display of the main display unit 14 not visible. Further, for example, in response to the stop of this display, the mode control unit 42 changes the mode to the modern standby mode in which the state is changed to the S0ix state (low power consumption state). The mode control unit 42 changes the CPU 11 and the chipset 21 from the S0 state to the S0ix state.

Here, the user's operation to make the display of the main display unit 14 not visible is a standby request. For example, it may be an operation wherein the cover CV equipped with the main display unit 14 is closed by the user, the user presses down a power button, that the modern standby mode is selected with an OS's operation, or the like.

Further, in the modern standby mode (standby mode) in which the display of the main display unit 14 is stopped, the mode control unit 42 performs control to switch between the S0 state, in which background processing is executed, and the S0ix state switchable to the background processing. In response to a periodic event trigger such as the timer, the mode control unit 42 changes the S0ix state to the S0 state to execute the background processing so as to execute a preset application 44.

Further, in the background processing, when a predetermined event to be notified to the user has occurred by the execution of the application 44, the mode control unit 42 makes a notification to the edge control unit 50.

Further, when the background processing is completed, the mode control unit 42 changes the S0 state to the S0ix state again. In the modern standby mode, upon reception of a start request (return request) from the edge control unit 50, when the power button is pressed down by the user, or when an event trigger occurs such as an operation of the key input unit 32 and the pointing device 33, the mode control unit 42 releases the modern standby mode and returns the laptop PC 1 to a normal operating mode (normal operating state). When returning to the normal operating mode, the display of the main display unit 14 is changed and started by the request from the edge control unit 50.

The display control unit 43 is, for example, a display driver, which is a device driver to use the main display unit 14 in the OS 41. The display control unit 43 displays, on the main display unit 14, a variety of information as a result of a request, for example, from the OS 41, the edge control unit 50, or the applications 44.

The applications 44 are application software running on the OS 41, such as word processing software, spreadsheet software, and e-mail software. Note that the applications 44 include application software executed in background processing to execute processing through the WLAN card 26 or the like, such as e-mail reception (mail arrival notification), reception of updating of an SNS (Social Networking Service) or reception of updating of the OS or an application program(s). When a predetermined event to be notified to the user has occurred such as that e-mail has been received, the application 44 concerned notifies the mode control unit 42 that the predetermined event has occurred as an event trigger.

The edge control unit 50 (an example of a start-up control unit) is application software running on the OS 41, which is one of applications that executes the background processing. The edge control unit 50 can operate background processing without being returned from the modern standby mode. The edge control unit 50 displays index information on the edge display unit 15 in the state where the display of the main display unit 14 is not visible (for example, in the state where the cover CV is closed). For example, the edge control unit 50 displays index information on the edge display unit 15 like index information (IDX1 to IDX7) illustrated in FIG. 1B.

In the examples illustrated in FIG. 1A and FIG. 1B, index information IDX1 (second index information) indicates private use and index information IDX2 (first index information) indicates business use. Further, index information IDX3 to index information IDX5 indicate phone notification, e-mail notification, and SNS notification in this order. Further, index information IDX6 and index information IDX7 indicate application "AP_A" and application "AP_B."

Further, the edge control unit 50 detects that the edge detection unit 35 is touched by the user, and when such an operation to make the display of the main display unit 14 visible (for example, an operation of opening the cover CV) is executed, the edge control unit 50 changes the display of the main screen depending on the touched part of the edge display unit 15 to start the display of the main display unit 14. In other words, the edge control unit 50 starts the display of the main display unit 14 to display, on the main screen of the main display unit 14, a screen corresponding to the touch operation area of the edge display unit 15 in which the touch operation was performed. The edge control unit 50 not only causes the display control unit 43 to display the main screen corresponding to the touch operation area, but also causes the mode control unit 42 to release the modern standby mode so as to return the laptop PC 1 to the normal operating mode.

The edge control unit 50 displays, on the edge display unit 15, information indicative of a use purpose, for example, as index information (for example, see index information IDX1 and index information IDX2 in FIG. 1A and FIG. 1B). The use purposes include business use and private use. In this case, when a display part of information indicative of a use purpose is touched as a touch part of the edge display unit 15, the edge control unit 50 starts the display of the main display unit 14 to display, on the main screen, a screen corresponding to the use purpose of the touched display part.

For example, when the use purpose of the touched display part is business use, the edge control unit 50 displays a desktop screen (for example, a main screen G2 in FIG. 5) on which the display of applications running before the display of the main display unit 14 is made not visible is minimized to start the main display unit 14. In other words, when the touch operation area is an area corresponding to index information IDX2 (first index information), the edge control unit 50 starts the display of the main display unit 14 to display a desktop screen on which the display of applications running before the display of the main display unit 14 was turned off is minimized. When the use purpose of the touched display area is "business," any other predefined screen or window(s) may be displayed in addition to the desktop screen. Here, an example of changing the display of the main screen by the edge control unit 50 before and after the modern standby mode by opening and closing the cover CV will be described with reference to FIG. 4 and FIG. 5.

Figure 4:
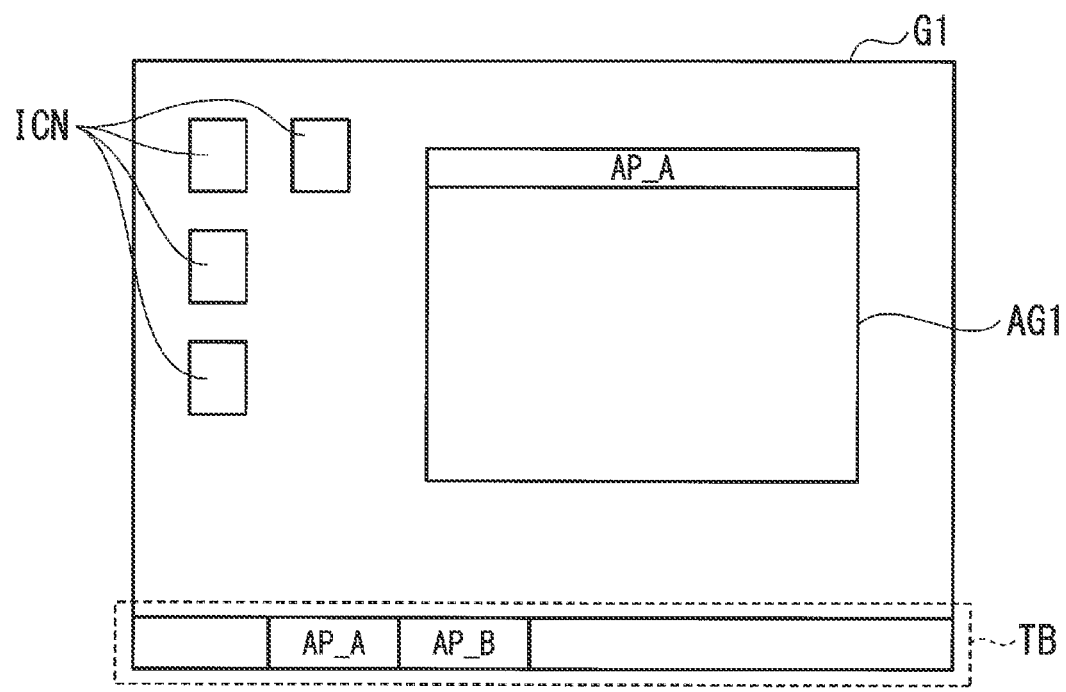
FIG. 4 is a diagram illustrating an example of a main screen on which a display screen of applications is displayed.

FIG. 4 is a diagram illustrating an example of the main screen on which a display screen of applications is displayed.

A main screen G1 illustrated in FIG. 4 displays a display screen AG1 of application "AP_A" before transition to the modern standby mode. In addition to the display screen AG1, for example, various icons ICN and a task bar TB are displayed on the main screen G1.

Figure 5:
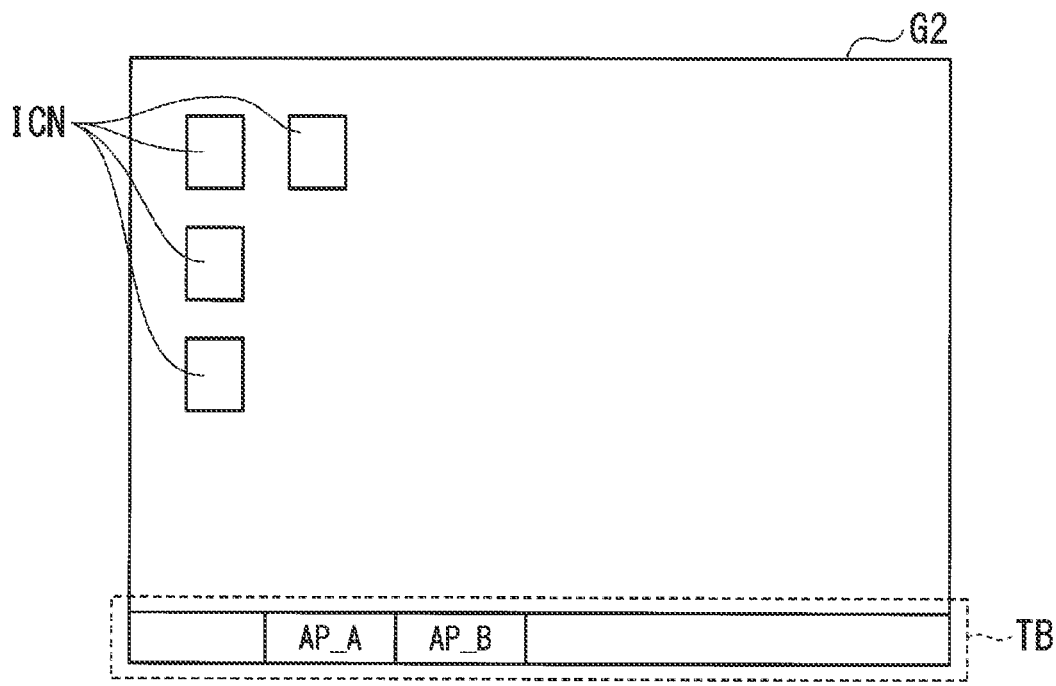
FIG. 5 is a diagram illustrating an example of a desktop screen on which the display of applications is minimized.

Suppose that, in a state where the cover CV is closed from the state illustrated in FIG. 4 to make a transition to the modern standby mode, the user touches the index information IDX2 illustrated in FIG. 1B. In this case, when the cover CV is opened while touching the index information IDX2, since the use purpose of the touched display part is business use, the edge control unit 50 returns the laptop PC 1 to display a main screen G2 illustrated in FIG. 5 on the main display unit 14. Here, the main screen G2 illustrated in FIG. 5 represents an example of a desktop screen on which the display of applications is minimized. Suppose further that the edge control unit 50 acquires information on opening/closing of the cover CV from the main system 40.

Further, when the use purpose of the touched display part is private use (for example, when index information IDX1 depicted in FIG. 1B is touched), the edge control unit 50 starts the display of the main display unit 14 to display a display screen of applications that were running before the display of the main display unit 14 was made not visible. In other words, when the touch operation area is an area corresponding to the index information IDX1 (second index information), the edge control unit 50 starts the display of the main display unit 14 to display a display screen of applications running before the display of the main display unit 14 was made not visible. The edge control unit 50 starts the display of the main display unit 14 to display the main screen G1 illustrated in FIG. 4.

Further, the edge control unit 50 causes the edge display unit 15 to display, as index information, notification information indicating that a predetermined event of which the user is to be notified has occurred (for example, see index information IDX3 to index information IDX5 in FIG. 1B). When receiving, from the main system 40, notification information indicating that the predetermined event of which the user is to be notified has occurred, the edge control unit 50 causes the edge display unit 15 to display the notification information.

Further, when a display part of the notification information is touched in the touch part of the edge display unit 15 and the cover CV is opened, the edge control unit 50 starts the display of the main display unit 14 to display a display screen of an application corresponding to the notification information of the touched display part. For example, when the user touches the index information IDX4 illustrated in FIG. 1B and opens the cover CV, the edge control unit 50 returns the laptop PC 1 to display, on the main display unit 14, a display screen of e-mail software as an application corresponding to the notification information in the touched display part. In other words, when the operation area that is touched is an area corresponding to the notification information, the edge control unit 50 starts the display of the main display unit 14 to display the display screen of the application related to the notification information.

Further, the edge control unit 50 causes the edge display unit 15 to display information indicative of an application as index information (for example, see index information IDX6 and index information IDX7 in FIG. 1B). When a display part of information indicative of the application is touched as the touch part of the edge display unit 15 and the cover CV is opened, the edge control unit 50 starts the display of the main display unit 14 to display the display screen of the application corresponding to the information in the touched display part. For example, when the user touches the index information IDX6 illustrated in FIG. 1B and opens the cover CV, the edge control unit 50 returns the laptop PC 1 to display the display screen of the application "AP_A" corresponding to the information in the touched display part. When the touch operation area is an area corresponding to information indicative of an application, the edge control unit 50 starts the display of the main display unit 14 to display the display screen of the application.

Referring next to a drawing, the operation of the laptop PC 1 according to the embodiment will be described.

Figure 6:
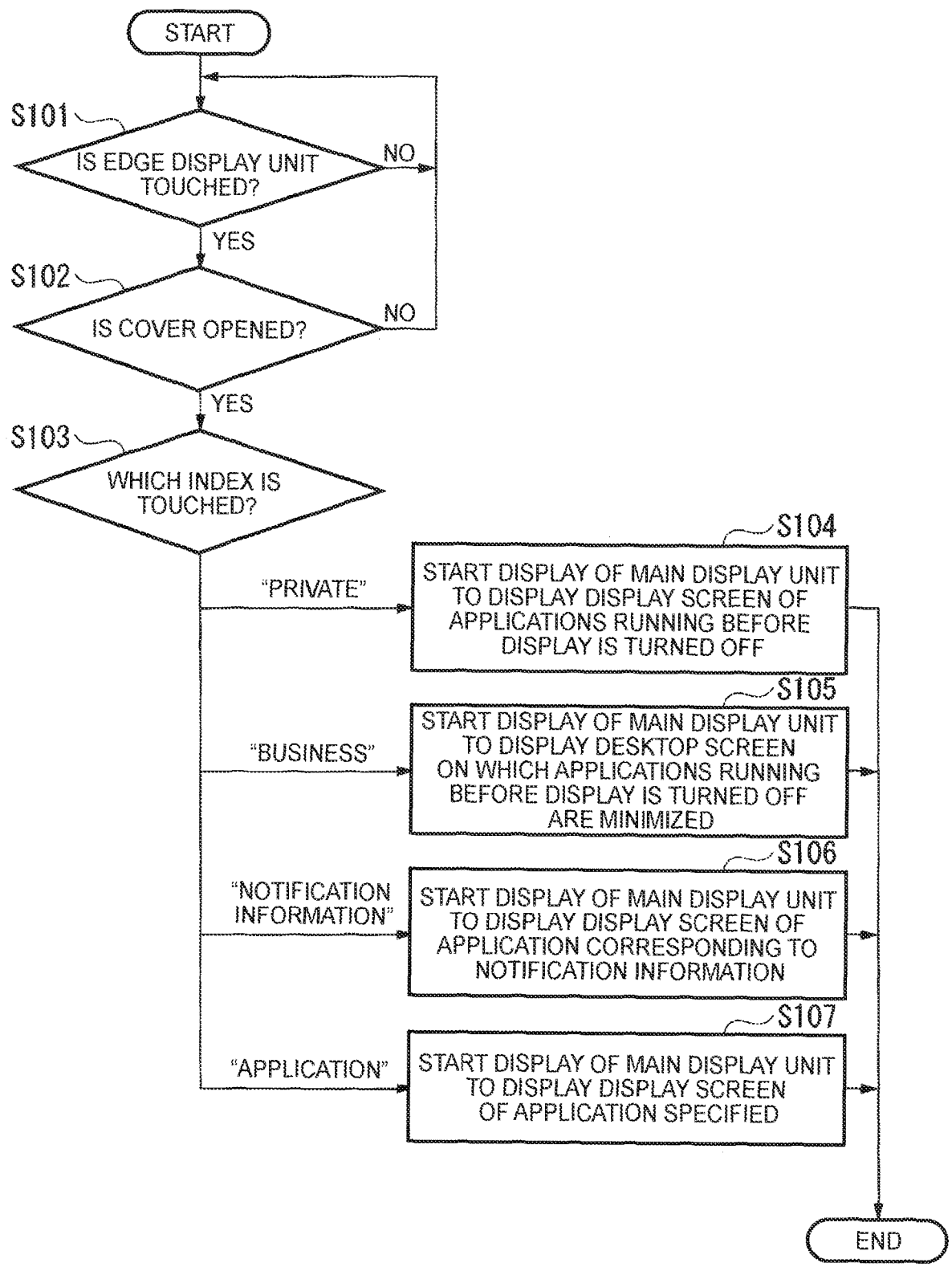
FIG. 6 is a flowchart illustrating an example of restart processing of the laptop PC according to the first embodiment.

FIG. 6 is a flowchart illustrating restart processing of the laptop PC 1 according to the embodiment. Here, restart processing of the laptop PC 1 in such a state that the cover CV of the laptop PC 1 is closed and the display of the main display unit 14 is stopped to put the mode in the modern standby mode will be described.

As illustrated in FIG. 6, the edge control unit 50 of the laptop PC 1 first determines whether the edge display unit 15 is touched or not (step S101). The edge control unit 50 uses the edge detection unit 35 to determine whether the touch on the edge display unit 15 is detected or not. When the edge display unit 15 is touched (step S101: YES), the edge control unit 50 proceeds to step S102. On the other hand, when the edge display unit 15 is not touched (step S101: NO), the edge control unit 50 returns to step S101.

In step S102, the edge control unit 50 determines whether the cover CV is opened or not. The edge control unit 50 acquires, from the main system 40, information on opening/closing of the cover CV detected by the sensor unit 36 to determine whether the cover CV is opened or not based on the opening/closing information. When the cover CV is opened (step S102: YES), the edge control unit 50 proceeds to step S103. On the other hand, when the cover CV is closed (step S102: NO), the edge control unit 50 returns to step S101.

In step S103, the edge control unit 50 executes branching processing depending on the touched index information.

For example, when the index information is "private" (in the case of index information IDX1 in FIG. 1B), the edge control unit 50 proceeds to step S104 to start (restart) the display of the main display unit 14 so as to display a display screen of applications running before the display is turned off. In other words, the edge control unit 50 causes the display control unit 43 of the main system 40 to display, on the main display unit 14, the display screen of applications running before the cover CV is closed, and causes the mode control unit 42 to return the laptop PC 1 from the modern standby mode. After step S104, the edge control unit 50 ends the processing.

Further, for example, when the index information is "business" (in the case of index information IDX2 in FIG. 1B), the edge control unit 50 proceeds to step S105 to start (restart) the display of the main display unit 14 so as to display a desktop screen (for example, the main screen G2 in FIG. 5) of applications running before the display is turned off. In other words, the edge control unit 50 causes the display control unit 43 of the main system 40 to minimize and display, on the main display unit 14, all applications running before the cover CV is closed, and causes the mode control unit 42 to return the laptop PC 1 from the modern standby mode. After step S105, the edge control unit 50 end the processing.

Further, for example, when the index information is "notification information" (any one of index information IDX3 to index information IDX5 in FIG. 1B), the edge control unit 50 proceeds to step S106 to start (restart) the display of the main display unit 14 so as to display the display screen of an application corresponding to the notification information. In other words, the edge control unit 50 causes the display control unit 43 of the main system 40 to display, on the main display unit 14, the display screen of the application corresponding to the notification information, and causes the mode control unit 42 to return the laptop PC 1 from the modern standby mode. After step S106, the edge control unit 50 ends the processing.

Further, for example, when the index information is an "application" (index information IDX6 or index information IDX7 in FIG. 1B), the edge control unit 50 proceeds to step S107 to start (restart) the display of the main display unit 14 so as to display the display screen of the application specified. In other words, the edge control unit 50 causes the display control unit 43 of the main system 40 to display, on the main display unit 14, the display screen of the specified application, and causes the mode control unit 42 to return the laptop PC 1 from the modern standby mode. After step S107, the edge control unit 50 ends the processing.

When displaying the display screen of the specified application on the main display unit 14, the edge control unit 50 may display the display screen of the specified application in the foreground or as a full-screen display. Further, the edge control unit 50 may minimize all but the specified application.

As described above, the laptop PC 1 (information processing apparatus) according to the embodiment includes the main display unit 14 (first display unit), the touch screen 10, and the edge control unit 50 (start-up control unit). The main display unit 14 displays the main screen. The touch screen 10 has the edge display unit 15 (second display unit) visible and displayable in the state where the display of the main display unit 14 is not visible, and the edge detection unit 35 (detection unit) which detects a touch operation on the edge display unit 15 with an operation medium. The edge control unit 50 displays index information on the edge display unit 15 in the state where the display of the main display unit 14 is not visible. When the touch operation is detected and an operation to make the display of the main display unit 14 visible is executed, the edge control unit 50 starts the display of the main display unit 14 to display, on the main screen, a screen corresponding to a touch operation area of the edge display unit 15 in which the touch operation was performed.

Thus, since the laptop PC 1 according to the embodiment can start the display of the main display unit 14 to display, on the main screen, a screen corresponding to a touch part (touch operation area) of the edge display unit 15 in which the touch operation was performed, user-friendliness can be improved.

Further, the laptop PC 1 according to the embodiment includes the first chassis 51 (cover CV) equipped with the main display unit 14, and the second chassis 52 connected rotatably through the hinge H provided on one end side of the first chassis 51. The touch screen 10 is provided on an edge of one chassis different from the other between the first chassis 51 rotated by the user and the second chassis 52 when the first chassis 51 and the second chassis 52 are relatively rotated to change from the state, where the first chassis 51 and the second chassis 52 are overlapped with each other to make the display surface (main screen) of the main display unit 14 face the second chassis 52 so as to make the display of the main display unit 14 not visible, to the state where the display of the main display unit 14 is visible.

Since the first chassis 51 (cover CV) can be opened easily while performing a touch operation on the touch screen 10, the laptop PC 1 according to the embodiment can start up by displaying, on the main screen, a screen corresponding to the touch operation area. Thus, the laptop PC 1 according to the embodiment can further improve user-friendliness.

In the embodiment, the edge on which the touch screen 10 is provided is an end face to face in a direction (direction L2) perpendicular to the direction of the rotation axis (direction L1) about which the first chassis 51 and the second chassis 52 are rotated (see the touch screen 10 in FIG. 1B).

Thus, the laptop PC 1 according to the embodiment is such that the first chassis 51 and the second chassis 52 can be relatively rotated easily while performing a touch operation on the touch screen 10 (for example, while holding down the edge display unit 15).

Further, in the embodiment, the edge control unit 50 displays, as index information, plural pieces of index information having at least first index information (for example, index information IDX2 for business use) and second index information (for example, index information IDX1 for private use). When the touch operation area is the area corresponding to the first index information, the edge control unit 50 starts the display of the main display unit 14 to display a desktop screen (for example, the main screen G2 in FIG. 5) on which applications running before the display of the main display unit 14 was made not visible are minimized. Further, when the touch operation area is the area corresponding to the second index information, the edge control unit 50 starts the display of the main display unit 14 to display the display screen of an application(s) that were running before the display of the main display unit 14 is made not visible.

Thus, the laptop PC 1 according to the embodiment can properly switch and start the display of the main display unit 14 depending on the index information in the touch operation area.

Further, in the embodiment, the edge control unit 50 displays, on the edge display unit 15, information indicative of the use purpose as index information. Then, when a display part of information indicative of the use purpose is touched as the touch part of the edge display unit 15, the edge control unit 50 changes the display of the main screen according to the use purpose of the touched display part and starts the display of the main display unit 14.

Thus, the laptop PC 1 according to the embodiment can switch (change) the display of the main screen selectively depending on the selected use purpose for which the display of the main display unit 14 is started. Therefore, the laptop PC 1 according to the embodiment can further improve user-friendliness.

Further, in the embodiment, the use purposes include business use and private use. When the use purpose of the touched display part is business use, the edge control unit 50 changes the display of applications running before the display of the main display unit 14 was made not visible to a desktop screen (for example, the main screen G2 in FIG. 5) on which the display of the running applications is minimized, and starts the display of the main display unit 14. Further, when the use purpose of the touched display part is private use, the edge control unit 50 changes the display to the display screen of the application(s) that were running before the display of the main display unit 14 was made not visible to start the display of the main display unit 14.

Thus, for example, even when returning to the normal operating mode for business use after being used for private use immediately before the display is stopped, the laptop PC 1 according to the embodiment never displays the display screen used for private use. Therefore, the laptop PC 1 according to the embodiment can prevent the display screen for private use from being seen by others in business use. Thus, the laptop PC 1 according to the embodiment can further improve user-friendliness.

Further, in the embodiment, the edge control unit 50 displays, on the edge display unit 15, notification information as index information which indicates that a predetermined event of which at least the user is to be notified has occurred. Then, when the touch operation area is an area corresponding to notification information, the edge control unit 50 starts the display of the main display unit 14 to display a display screen of an application related to the notification information.

Thus, since the laptop PC 1 according to the embodiment can display the display screen of an application in which the event has occurred to start the main display unit 14, the notification information can be checked immediately after the start-up.

Further, in the embodiment, the edge control unit 50 displays, on the edge display unit 15, information indicative of an application as index information. Then, when the touch operation area is an area corresponding to information indicative of an application, the edge control unit 50 starts the display of the main display unit 14 to display the display screen of the application corresponding to the touch operation area.

Thus, since the laptop PC 1 according to the embodiment can display the display screen of the application specified by the index information to start the main display unit 14, user-friendliness can further be improved.

Further, in the embodiment, the state where the display of the main display unit 14 is not visible is the state where the openable cover CV of the own apparatus is closed, and the operation to make the display of the main display unit 14 visible includes an operation to open the cover CV of the own apparatus.

Thus, the laptop PC 1 according to the embodiment can start the main display unit 14 to display a desired display screen with such simple operations as touching the edge display unit 15 and opening the cover CV.

Further, in the embodiment, the state where the display of the main display unit 14 is not visible is the state of a standby mode (for example, modern standby mode), being put in the low power consumption state capable of being switched to an operating state of executing background processing.

Thus, the laptop PC 1 according to the embodiment can display, on the edge display unit 15, notification information as index information that indicates that a predetermined event to be notified to the user has occurred while achieving low power consumption, and hence user-friendliness can further be improved.

Further, the control method according to the embodiment is a control method for the laptop PC 1 including the main display unit 14 which displays the main screen, the edge display unit 15 visible and displayable in the state where the display of the main display unit 14 is not visible, and the touch screen 10 having the edge detection unit 35 which detects a touch operation on the edge display unit 15 with an operation medium. The control method includes a display step and a start-up control step. In the display step, the edge display unit 15 displays index information in the state where the display of the main display unit 14 is not visible. In the start-up control step, the edge control unit 50 detects a touch operation in the state where the display of the main display unit 14 is not visible, and when an operation to make the display of the main display unit 14 visible is executed, the edge control unit 50 starts the display of the main display unit 14 to display, on the main screen, a screen corresponding to a touch operation area in which the touch operation was performed on the edge display unit 15.

Thus, the control method according to the embodiment has the same effect as the laptop PC 1 described above, and hence user-friendliness can be improved.

Further, the laptop PC 1 according to the embodiment includes the first chassis 51, the second chassis 52, and the touch screen 10. The first chassis 51 is equipped with the main display unit 14 which displays the main screen. The second chassis 52 is rotatably connected to the first chassis 51 through the hinge H provided on one end side of the first chassis 51. The touch screen 10 has the edge display unit 15 and the edge detection unit 35. The edge display unit 15 is visible and displayable in the state where the first chassis 51 and the second chassis 52 are overlapped with each other to make the display surface of the main display unit 14 face the second chassis 52 so as to make the display of the main display unit 14 not visible. The edge detection unit 35 detects a touch operation on the edge display unit 15 with an operation medium. The touch screen 10 is provided on one edge opposite to the other of one chassis different from the other chassis provided with the hinge H between the first chassis 51 and the second chassis 52.

Thus, the laptop PC 1 according to the embodiment makes it easy to take the edge of the chassis with user's fingers to rotate the chassis (for example, the first chassis 51) while performing the touch operation on the touch screen 10, and this can improve user-friendliness.

Second Embodiment

Next, a laptop PC 1a according to a second embodiment will be described with reference to drawings.

In the embodiment, a variation in which applications to be displayed when the display of the main display unit 14 is started are changed between private use and business use will be described.

Figure 7:
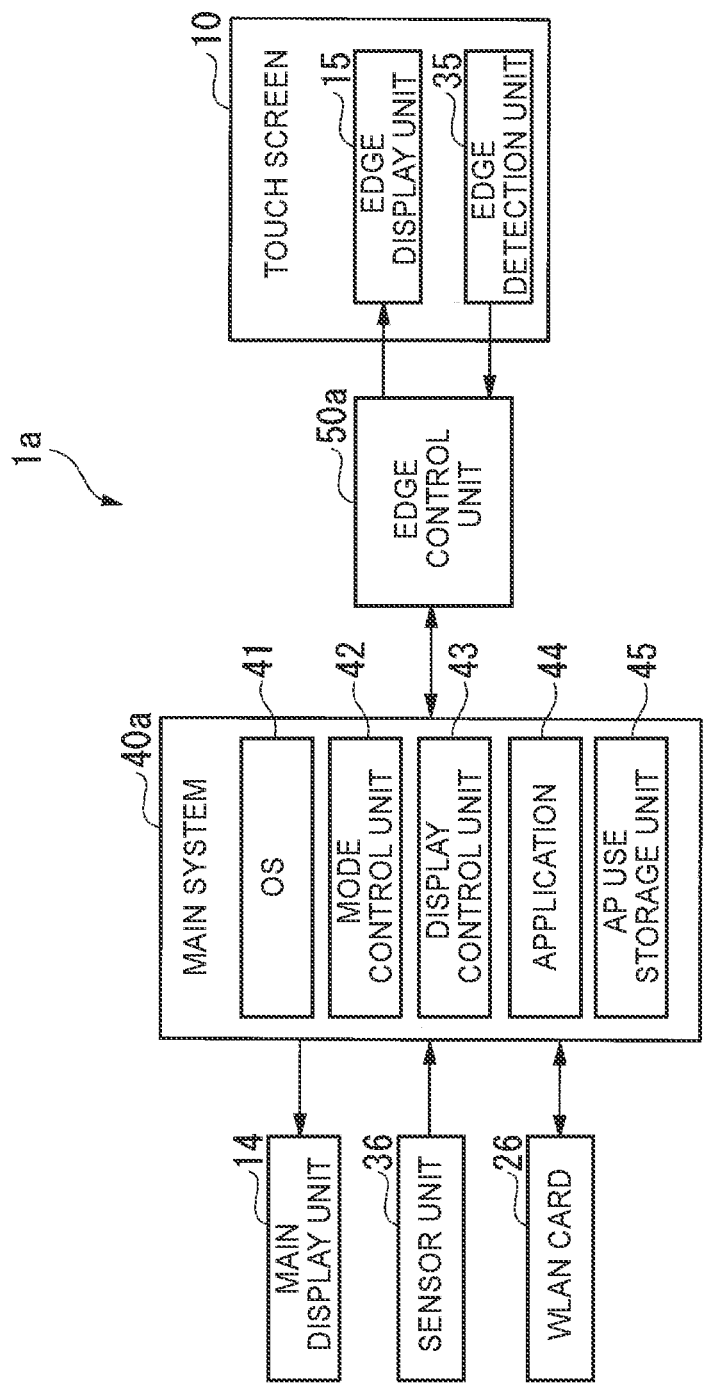
FIG. 7 is a block diagram illustrating an example of the functional configuration of a laptop PC according to a second embodiment.

FIG. 7 is a block diagram illustrating an example of the functional configuration of the laptop PC 1a according to the embodiment.

Since the appearance and main hardware configuration of the laptop PC 1a according to the embodiment are the same as those in the first embodiment illustrated in FIG. 1A, FIG. 1B and FIG. 2, the description thereof will be omitted here.

As illustrated in FIG. 7, the system of the laptop PC 1a includes a main system 40a and an edge control unit 50a, which are implemented by software.

Note that the same components in FIG. 7 as those in the first embodiment illustrated in FIG. 3 described above are given the same reference numerals to omit the description here.

The main system 40a includes the OS 41, the mode control unit 42, the display control unit 43, the applications 44, and an AP use storage unit 45.

The AP use storage unit 45 stores information on each application corresponding to each use purpose. For example, the AP use storage unit 45 stores information indicative of the use purpose and information on the application in association with each other. In other words, the AP use storage unit 45 stores each application corresponding to each index information. For example, in the AP use storage unit 45, information indicative of an application(s) corresponding to private use and information indicative of an application(s) corresponding to business use are prestored.

In the AP use storage unit 45, an application(s) corresponding to each use purpose may be registered by the user. Alternatively, for example, a business mode and a private mode may be provided in the main system 40a so that applications executed in respective modes will be registered automatically.

The basic functions of the edge control unit 50a are the same as those of the edge control unit 50 in the first embodiment described above. The edge control unit 50a in the embodiment differs from that in the first embodiment in how to display the display screen of an application(s) corresponding to each use purpose when the display of the main display unit 14 is started.

The edge control unit 50a in the embodiment minimizes all but an application corresponding to the use purpose of the touched display part among applications running before the display of the main display unit 14 was made not visible to start the display of the main display unit 14. Note that the edge control unit 50a refers to the information stored in the AP use storage unit 45 of the main system 40a to determine the application corresponding to the use purpose.

For example, when the use purpose is private use, the edge control unit 50a refers to the AP use storage unit 45 to acquire an application corresponding to private use. The edge control unit 50a minimizes all but the acquired application corresponding to private use to start the display of the main display unit 14.

Further, for example, when the use purpose is business use, the edge control unit 50a refers to the AP use storage unit 45 to acquire information on an application corresponding to business use. The edge control unit 50a minimizes all but the acquired application corresponding to business use to start the display of the main display unit 14.

Figure 8:
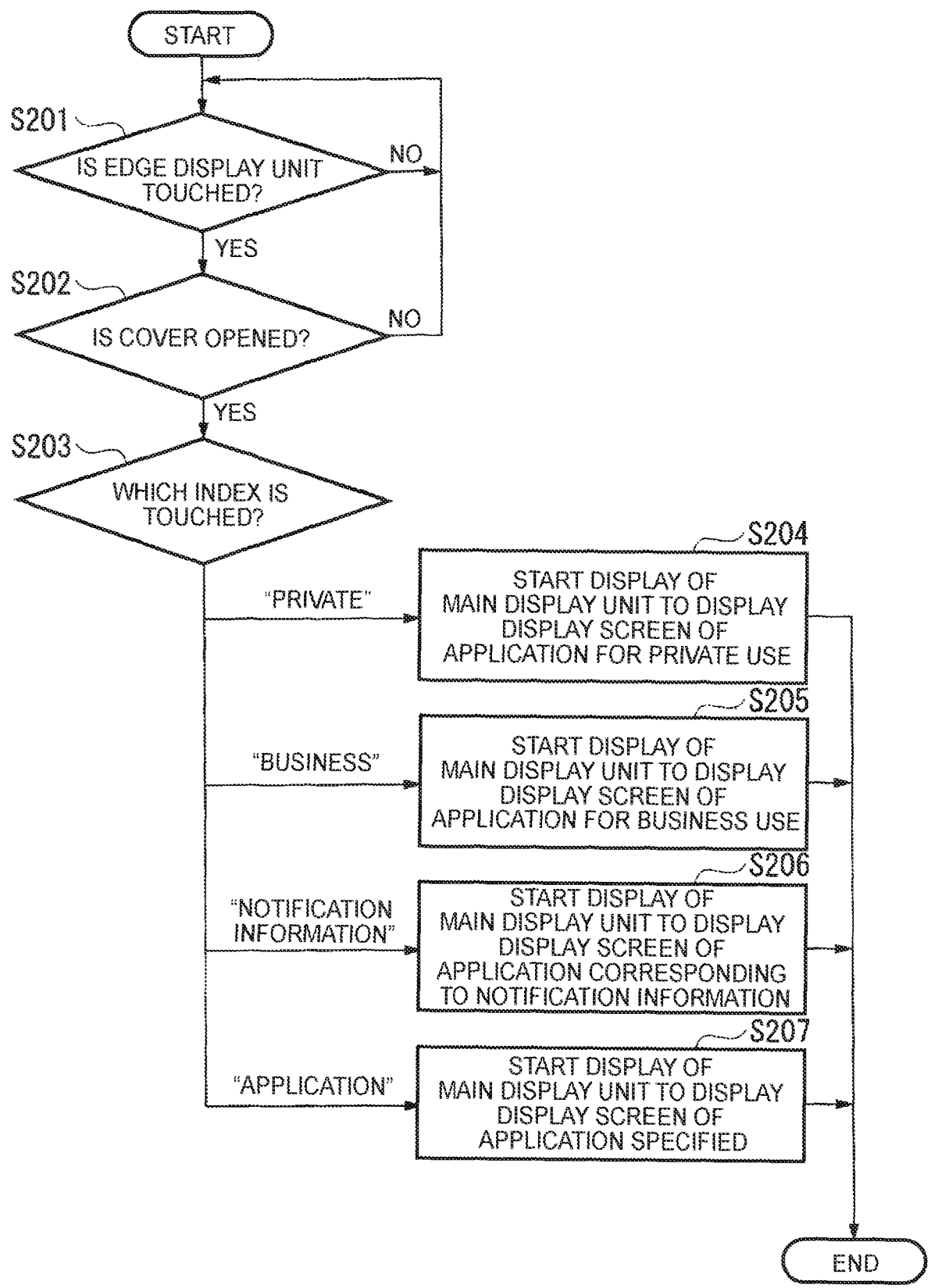
FIG. 8 is a flowchart illustrating an example of restart processing of the laptop PC according to the second embodiment.

Referring next to FIG. 8, the operation of the laptop PC 1a according to the embodiment will be described.

FIG. 8 is a flowchart illustrating an example of restart processing of the laptop PC 1a according to the embodiment. Here, restart processing of the laptop PC 1a will be described in such a state that the cover CV of the laptop PC 1a is closed, the display of the main display unit 14 is stopped, and the operating mode is put in the modern standby mode.

As illustrated in FIG. 8, the edge control unit 50a of the laptop PC 1a first determines whether the edge display unit 15 is touched or not (step S201). Since processing step S201 to step S203, and processing step S206 and step S207 are the same as processing step S101 to step S103 and processing step S106 and step S107 illustrated in FIG. 6 described above, the description thereof will be omitted here.

In step S203, for example, when index information is "private," the edge control unit 50a proceeds to step S204 to start (restart) the display of the main display unit 14 so as to display the display screen of an application for private use. In other words, the edge control unit 50a refers to the AP use storage unit 45 of the main system 40a to acquire information on the application corresponding to private use. The edge control unit 50a minimizes all but the acquired application corresponding to private use to start the display of the main display unit 14. The edge control unit 50a causes the display control unit 43 of the main system 40a to display, on the main display unit 14, the display screen of the application corresponding to private use, and causes the mode control unit 42 to return the laptop PC 1a from the modern standby mode. After step S204, the edge control unit 50a ends the processing.

Further, for example, when the index information is "business," the edge control unit 50a proceeds to step S205 to start (restart) the display of the main display unit 14 so as to display the display screen of a business application. In other words, the edge control unit 50a refers to the AP use storage unit 45 of the main system 40a to acquire information on the application corresponding to business use. The edge control unit 50a minimizes all but the acquired application corresponding to business use to start the display of the main display unit 14. The edge control unit 50a causes the display control unit 43 of the main system 40a to display, on the main display unit 14, the display screen of the application corresponding to business use, and causes the mode control unit 42 to return the laptop PC 1a from the modern standby mode. After step S205, the edge control unit 50a ends the processing.

As described above, in the laptop PC 1a according to the embodiment, the edge control unit 50a minimizes all but an application corresponding to the use purpose of the touched display part among applications running before the display of the main display unit 14 was made not visible to start the display of the main display unit 14. For example, the laptop PC 1a according to the embodiment includes the AP use storage unit 45 which stores each application corresponding to index information. When the touch operation area is an area corresponding to each index information, the edge control unit 50a minimizes all but the application corresponding to the index information based on information stored in the AP use storage unit 45 among applications running before the display of the main display unit 14 was made not visible to start the display of the main display unit 14.

Thus, the laptop PC 1a according to the embodiment can properly switch between display screens depending on the use purpose to start the display of the main display unit 14, and hence user-friendliness can further be improved. For example, even when returning to the normal operating mode for business use after being used for private use immediately before the display is stopped, the laptop PC 1a according to the embodiment never displays the display screen used for private use. Therefore, the laptop PC 1a according to the embodiment can prevent the display screen for private use from being seen by others in business use. The laptop PC 1a according to the embodiment can also prevent the display screen for business use from being seen by others in private use.

In the aforementioned first and second embodiments, the example in which the edge detection unit 35 detects a touch to change the display of the main screen is described, but the edge detection unit 35 may detect contact with a predetermined touch operation (contact operation) such as a double tap or a long press to change the display of the main screen. In other words, when the edge detection unit 35 detects a touch with a predetermined touch operation in the state where the display of the main display unit 14 is not visible and an operation to make the display of the main display unit 14 visible is executed, the edge control unit 50 (50a) may start the display of the main display unit 14 to display, on the main screen, a screen corresponding to the touch part of the edge display unit 15. In other words, touch operations include a single tap, two or more taps or a long-press operation to press the edge detection unit 35 for a predetermined period of time, and the like.

Thus, the laptop PC 1 (1a) can reduce malfunction due to misdetection of the edge detection unit 35.

Third Embodiment

Next, a tablet PC 1b according to a third embodiment will be described with reference to a drawing.

In the embodiment, a variation in which the information processing apparatus is the tablet PC 1b equipped with such a touch screen 10a that the main display unit 14 and the edge display unit 15 described above are constructed by one panel will be described.

Figure 9A:
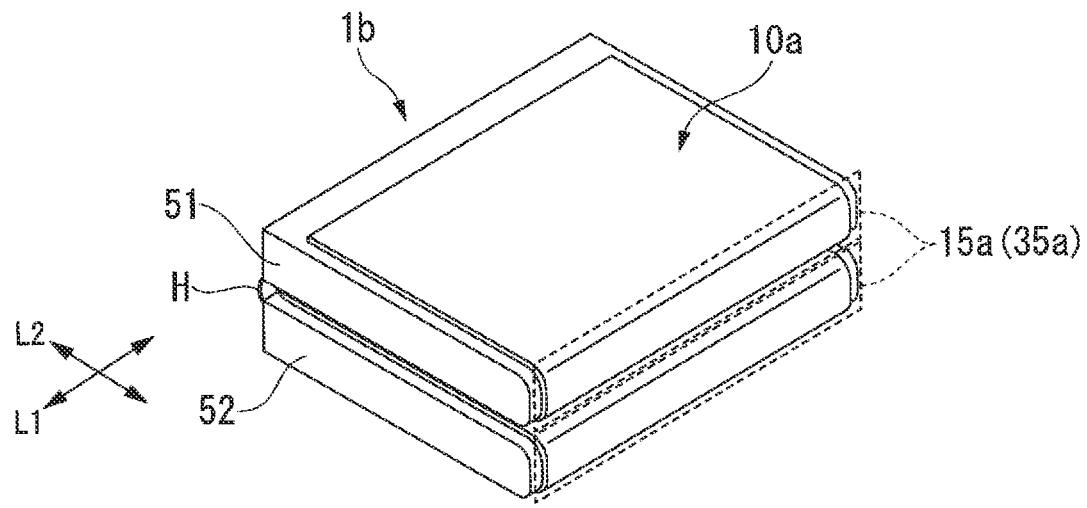
FIG. 9A is an external view illustrating an example of a tablet PC in a state where the tablet PC is folded, according to a third embodiment.

FIG. 9A is an external view illustrating an example of a tablet PC in a state where the tablet PC is folded, according to a third embodiment.

Figure 9B:
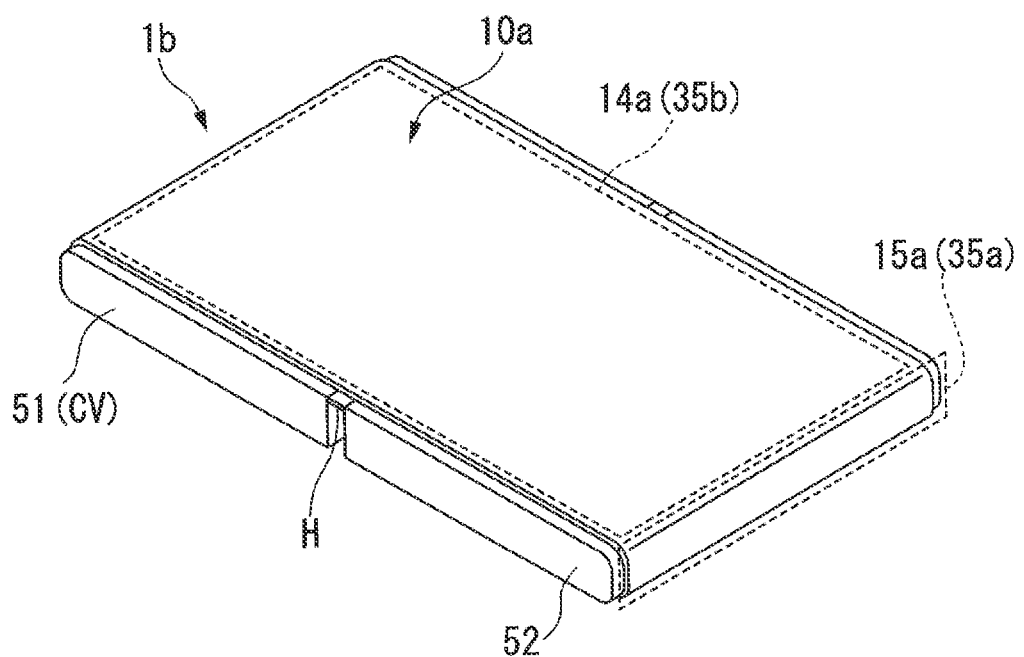
FIG. 9B is an external view illustrating an example of a tablet PC in a state where a first chassis and a second chassis are opened and linearly disposed, according to a third embodiment.

FIG. 9B is an external view illustrating an example of a tablet PC in a state where a first chassis and a second chassis are opened and linearly disposed, according to a third embodiment.

As illustrated in FIG. 9A and FIG. 9B, the tablet PC 1b is such that the first chassis 51 and the second chassis 52 are connected through the hinge H, and one touch screen 10a is placed on the surfaces of the first chassis 51 and the second chassis 52. FIG. 9A is an external view illustrating a state where the tablet PC 1b is folded, and FIG. 9B is an external view of a state where the first chassis 51 and the second chassis 52 are opened and linearly disposed. In FIG. 9A and FIG. 9B, description is made on condition that the rotation axis direction of the first chassis 51 and the second chassis 52 is denoted by direction L1 and a direction perpendicular to the rotation axis direction is denoted by direction L2.

The touch screen 10a includes a main display unit 14a, an edge display unit 15a, an edge detection unit 35a, and a main detection unit 35b.

The one display panel which constructs the main display unit 14a and the edge display unit 15a is, for example, an organic EL display configured to be bendable (foldable). The main display unit 14a displays a main screen. The main detection unit 35b is overlapped with the main display unit 14a to function as the key input unit 32 and the pointing device 33 described above.

The edge display unit 15a is arranged in two places on a side face of the first chassis 51 and a side face of the second chassis 52 to display index information like in the first and second embodiments described above. Further, like in the first and second embodiments, the edge detection unit 35a detects a touch operation on the edge display unit 15a with an operation medium.

Note that the edge detection unit 35a and the main detection unit 35b may be constructed as one touch panel, or constructed by two or more touch panels.

Further, in the embodiment, the first chassis 51 corresponds to the cover CV, FIG. 9A corresponds to the state where the cover CV is closed, and FIG. 9B corresponds to the state where the cover CV is open.

Note that the main hardware configuration and functional configuration of the tablet PC 1b according to the embodiment are the same as those in the first and second embodiments illustrated in FIG. 2 and FIG. 3 (or FIG. 7) except that the main display unit 14, the touch screen 10, the key input unit 32, and the pointing device 33 are replaced by the touch screen 10a.

Further, since the operation of the tablet PC 1b according to the embodiment is the same as that in the first and second embodiments, the description thereof is omitted here.

As described above, the tablet PC 1b according to the embodiment is such that the main display unit 14a and the edge display unit 15a are constructed as one display unit. In other words, the main display unit 14a and the edge display unit 15a are different display areas of one display device.

Thus, the tablet PC 1b according to the embodiment can reduce the number of parts, and hence reduce the power consumption of the entire system.

In the embodiment, as illustrated in FIG. 9A and FIG. 9B, the touch screen 10a is provided on an edge(s) of either one or both of the first chassis 51 and the second chassis 52 that are subjected to the user's rotation operation when the first chassis 51 and the second chassis 52 are relatively rotated to change from the state, where the first chassis 51 and the second chassis 52 are overlapped with each other so that the display surface of the main display unit 14a will face the second chassis 52 to make the display of the main display unit 14a not visible, to the state where the display of the main display unit 14a is visible.

Thus, the tablet PC 1b according to the embodiment makes easy the operation to rotate the chassis (for example, the first chassis 51) while performing the touch operation on the touch screen 10a, and this can improve user-friendliness.

In the embodiment, the edge display unit 15a may be arranged in a display area near an edge of the top face to extend from the side face instead of the side face of the first chassis 51 and the side face of the second chassis 52 so as to display index information. In this case, the edge detection unit 35a detects a touch operation to the area with an operation medium like in the above-descried first and second embodiments. The edge on which the edge display unit 15a and the edge detection unit 35a are provided may be, for example, one edge (for example, top edge) opposite to the other edge, on which the hinge H is provided, on one face opposite to the other face of the first chassis 51, on which the display surface of the main display unit 14a is formed.

Fourth Embodiment

Next, a laptop PC 1c according to a fourth embodiment will be described with reference to a drawing.

In the embodiment, a variation in which the layout of the touch screen 10 of the laptop PC 1 according to the above-described first embodiment is changed will be described.

Figure 10:
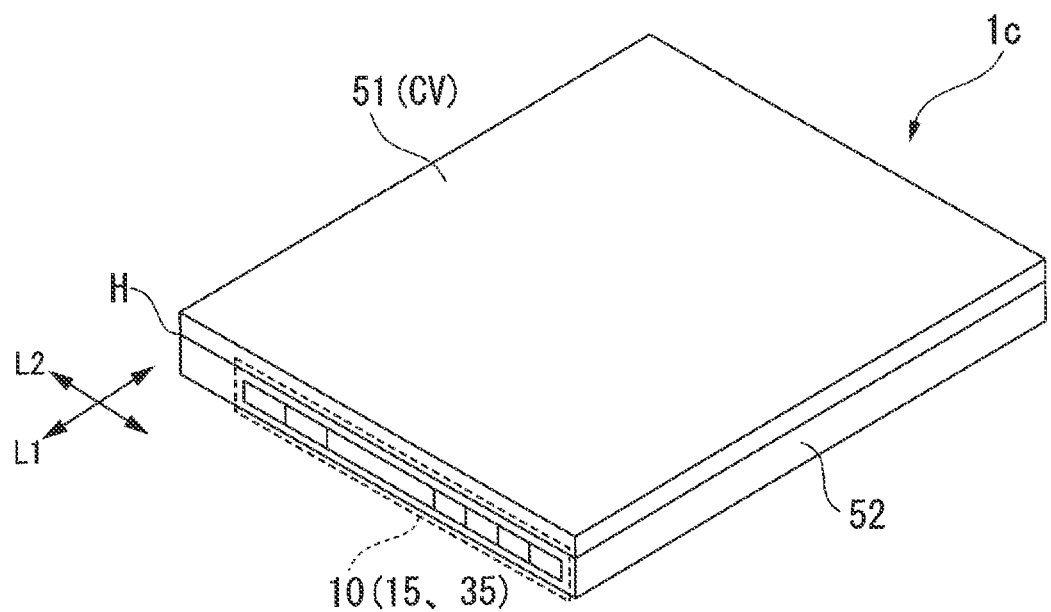
FIG. 10 is an external view illustrating an example of a laptop PC according to a fourth embodiment.

FIG. 10 is an external view illustrating an example of the laptop PC 1c according to the embodiment.

As illustrated in FIG. 10, in the laptop PC 1c according to the embodiment, the touch screen 10 is arranged on a lateral side face of the second chassis 52. In other words, the edge on which the touch screen 10 is provided is an end face that faces in a direction (direction L1) parallel to the direction of the rotation axis about which the first chassis 51 (cover CV) and the second chassis 52 are rotated. Since the other components of the laptop PC 1c and the operation of the laptop PC 1c are the same as those in the first or second embodiment, the description thereof is omitted here.

As described above, in the embodiment, the edge on which the touch screen 10 is provided is the end face to face in the direction (direction L1) parallel to the direction of the rotation axis about which the first chassis 51 and the second chassis 52 are rotated.

Thus, the laptop PC 1c according to the embodiment allows the user to rotate the first chassis 51 (cover CV) with one hand while performing the touch operation on the touch screen 10 with the other hand to ensure the above-described start operation.

Fifth Embodiment

Next, a laptop PC 1d according to a fifth embodiment will be described with reference to a drawing.

In the embodiment, another variation in which the layout of the touch screen 10 of the laptop PC 1 according to the above-described first embodiment is changed will be described.

Figure 11:
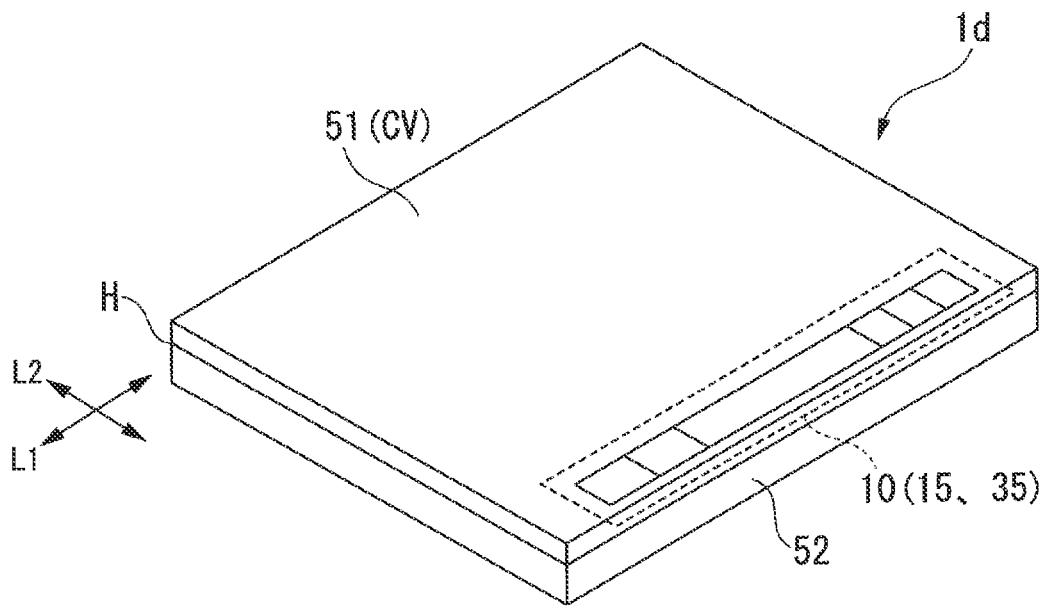
FIG. 11 is an external view illustrating an example of a laptop PC according to a fifth embodiment.

FIG. 11 is an external view illustrating an example of the laptop PC 1d according to the embodiment.

As illustrated in FIG. 11, in the laptop PC 1d according to the embodiment, the touch screen 10 is arranged on a face (an edge of the top face) on the back side (opposite side) of the main display unit 14. In other words, the edge of the first chassis 51 along which the touch screen 10 is provided is an edge on one side opposite to the other side along which the hinge H is provided, on the face opposite to the face on which the display surface of the main display unit 14 is formed. Since the other components of the laptop PC 1d and the operation of the laptop PC 1d are the same as those in the first or second embodiment, the description thereof is omitted here.

As described above, in the embodiment, the edge along which the touch screen 10 is provided is an edge on one side opposite to the other side on which the hinge H is provided, on the face of the first chassis 51 opposite to the face on which the display surface of the main display unit 14 is formed.

Thus, the laptop PC 1d according to the embodiment allows the user to rotate the first chassis 51 while holding down the touch screen 10 on the edge of the top face of the first chassis 51 with one hand.

Note that the present invention is not limited to each of the aforementioned embodiments, and changes are possible without departing from the scope of the present invention.

For example, in each of the aforementioned embodiments, the laptop PC 1 (1a, 1c, 1d) or the tablet PC 1b as an example of the information processing apparatus is described, but the present invention is not limited thereto, and the information processing apparatus may also be a PDA (Personal Digital Assistant), a smartphone, or the like.

Further, in each of the aforementioned embodiments, the edge control unit 50 (50a) may stop the display of the edge display unit 15 (15a) (display off) when a given time has elapsed in the state where the cover CV is closed. In this case, when a touch is detected by the edge detection unit 35

(35a), the edge detection unit 35 (35a) detects the touch in the display part after the edge control unit 50 (50a) restarts the display of the edge display unit 15 (15a).

Thus, the laptop PC 1 (1a, 1c, 1d) or the tablet PC 1b can reduce power consumption.

Further, the edge control unit 50 (50a) may stop the display of the edge display unit 15 (15a) periodically. Further, the edge control unit 50 (50a) may detect that the apparatus is made horizontal to restart the display of the edge display unit 15 (15a).

Further, in each of the aforementioned embodiments, when index information for an intended use is touched, the edge control unit 50 (50a) may additionally display, on the edge display unit 15 (15a), information indicative of an application corresponding to the intended use. In this case, the edge control unit 50 (50a) may start the display of the main display unit 14 (14a) to display the display screen of the application when the display part of the information indicative of the application is further touched. Thus, the laptop PC 1 (1a, 1c, 1d) or the tablet PC 1b can further improve user-friendliness.

Further, in each of the aforementioned embodiments, the example in which the intended uses are two kinds of private use and business use is described, but the present invention may support three or more kinds of intended uses. For example, business use may be divided into the main job and a side job, or divided by the business project.

Further, in each of the aforementioned embodiments, the laptop PC 1 (1a, 1c, 1d) or the tablet PC 1b may switch to and start a login screen (for example, a login screen on which a login ID is changed) depending on the intended use or the index information on which a touch operation was performed.

Further, in each of the aforementioned embodiments, the edge control unit 50 (50a) may change the color of index information to be displayed on the edge display unit 15 (15a) depending on the intended use such as private use or business use. Further, when receiving notification information, the edge control unit 50 (50a) may blink the display part of the notification information or display the number of notifications additionally.

Further, in each of the aforementioned embodiments, the modern standby mode is described as an example of the standby mode in the low power consumption state, but the present invention is not limited thereto. For example, the processing of the edge control unit 50 (50a) may also be applied to any other standby mode such as any other power-saving mode, any other standby state, or a hibernation state.

Further, in the first, second, and fourth embodiments, the example in which the second chassis 52 is equipped with the touch screen 10 is described, but the first chassis 51 may be equipped with the touch screen 10 like in the third and fifth embodiments.

Note that each of the laptop PC 1 (1a, 1c, 1d) and the tablet PC 1b described above has a computer system therein. Then, a program for implementing the function of each component included in each of the laptop PC 1 (1a, 1c, 1d) and the tablet PC 1b described above may be recorded on a computer-readable recording medium so that the program recorded on this recording medium will be read into the computer system and executed to perform processing in each component included in each of the laptop PC 1 (1a, 1c, 1d) and the tablet PC 1b described above. Here, the fact that "the program recorded on the recording medium is read into the computer system and executed" includes installing the program on the computer system. Here, the "computer system" includes the OS and hardware such as peripheral devices.

Further, the "computer system" may also include two or more computers connected through a network such as the Internet, WAN, LAN, and a communication line like a dedicated line. Further, the "computer-readable recording medium" means a storage medium such as a flexible disk, a magneto-optical disk, a ROM, a portable medium like a CD-ROM, or a hard disk incorporated in the computer system. The recording medium with the program stored thereon may be a non-transitory recording medium such as the CD-ROM.

A recording medium internally or externally provided to be accessible from a delivery server for delivering the program is included as the recording medium. Note that the program may be divided into plural pieces, downloaded at different timings, respectively, and then united in each component included in each of the laptop PC 1 (1a, 1c, 1d) and the tablet PC 1b, or delivery servers for delivering respective divided pieces of the program may be different from one another. Further, the "computer-readable recording medium" includes a medium on which the program is held for a given length of time, such as a volatile memory (RAM) inside a computer system as a server or a client when the program is transmitted through the network. The above-mentioned program may also be to implement some of the functions described above. Further, the program may be a so-called differential file (differential program) capable of implementing the above-described functions in combination with a program(s) already recorded in the computer system.

Further, some or all of the functions described above may be realized as an integrated circuit such as LSI (Large Scale Integration). Each of the above-described functions may be implemented by a processor individually, or part or whole thereof may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

DESCRIPTION OF SYMBOLS 1, 1a laptop PC
1b tablet PC
10, 10a touch screen
11 CPU
12 main memory
13 video subsystem
14, 14a main display unit
15, 15a edge display unit
21 chipset
22 BIOS memory
23 HDD
24 USB connector
25 audio system
26 WLAN card
31 embedded controller
32 key input unit
33 pointing device
34 power supply circuit
35, 35a edge detection unit
35b main detection unit
36 sensor unit
40, 40a main system 41 OS
42 mode control unit
43 display control unit
44 application
45 AP use storage unit
50, 50a edge control unit
51 first chassis
52 second chassis
CV cover
H hinge

What is claimed is:

1. An information processing apparatus, comprising:
a first display unit located on an openable and closeable first surface;
a touch screen located on a second surface, the touch screen comprising:
  a second display unit on the second surface that is visible when the first display unit is open and closed,
  an operation area comprising a plurality of index touch areas, and
  a detection unit that detects a touch operation made in each index touch area of the plurality of index touch areas on the operation area on the touch screen in response to the first surface being closed and the first display unit is not visible and is turned OFF; and
a control unit that:
  displays index information on each index touch area of the plurality of index touch areas on the operation area on the touch screen in response to the first surface being in a closed state, the first display unit not being visible, and the first display unit being turned OFF,
  in response to the first surface being opened from the closed state, determines which index touch area of the plurality of index touch areas on the operation area on the touch screen is currently being touched by a user, and
  in response to opening the first surface from the closed state and determining which touched index touch area is currently being touched by the user, displays a screen configuration of a plurality of screen configurations or an application of a plurality of applications on the first display unit corresponding to the touched index touch area of the operation area of the touch screen,
wherein:
  each screen configuration of the plurality of screen configurations comprises a respective first display screen associated with a use purpose and comprises one or more applications for display on the first display unit, and
  each application comprises a respective second display screen for display on the first display unit screen.

2. The information processing apparatus of claim 1, further comprising:
a first chassis to which the first display unit is coupled; and
a second chassis rotatably connected to the first chassis through a hinge.

3. The information processing apparatus of claim 2, wherein:
the touch screen is provided on a side of the second chassis that faces in a direction perpendicular to a direction of a rotation axis about which the first chassis and the second chassis rotate.

4. The information processing apparatus of claim 2, wherein:
the touch screen is provided on a side of the second chassis that faces in a direction parallel to a direction of a rotation axis about which the first chassis and the second chassis rotate.

5. The information processing apparatus of claim 2, wherein:
the touch screen is provided on a surface of the first chassis opposite another surface of the first chassis to which the first display unit is coupled.

6. The information processing apparatus of claim 1, wherein:
the index information comprises first index information and second index information;
in response to the touch operation area corresponding to the first index information, the start-up control unit displays, on the first display unit, a screen configuration associated with the first index information; and
in response to the touch operation area corresponding to the second index information, the start-up control unit displays, on the first display unit, a screen configuration associated with the second index information.

7. The information processing apparatus of claim 1, further comprising:
a storage unit that stores an application,
wherein:
  the index information includes information that corresponds to the application, and
  the operation area corresponds to the information that corresponds to the application.

8. The information processing apparatus of claim 1, wherein:
the index information includes notification information; and
in response to the operation area corresponding to the notification information, the start-up control unit displays an application related to the notification information.

9. The information processing apparatus of claim 1, wherein:
the index information comprises information indicative of an application; and
in response to the operation area corresponding to the information indicative of the application, the start-up control unit displays the application.

10. The information processing apparatus of claim 1, wherein:
the first display unit and the second display unit are different display areas of one display device.

11. An information processing apparatus, comprising:
a first chassis;
a second chassis that is rotatably coupled to the first chassis through a hinge provided near a first end the first chassis;
a first display unit located on an openable and closeable first surface; and
a touch screen located on a second surface, the touch screen comprising:
  a second display unit on the second surface that is visible when the first display unit is open and closed, wherein the first chassis overlaps the second chassis, and the first display unit faces the second chassis,
  an operation area comprising a plurality of index touch areas, and
  a detection unit that detects a touch operation made in each index touch area of the plurality of index touch area on the operation area on the touch screen in response in response to the first surface being closed and the first display unit is not visible and is turned OFF.

12. The information processing apparatus according to claim 11, wherein:
the touch screen is provided on a surface of the apparatus that faces in a direction perpendicular to a direction of a rotation axis about which the first chassis and the second chassis are rotated.

13. The information processing apparatus of claim 11, wherein:
the touch screen is provided on a surface that faces in a direction parallel to a direction of a rotation axis about which the first chassis and the second chassis are rotated.

14. The information processing apparatus of claim 11, wherein:
the first display unit is coupled to a surface of the first chassis; and
the touch screen is provided on another surface of the first chassis opposite the surface to which the first display unit is coupled.

15. The information processing apparatus of claim 11, wherein:
the first display unit and the second display unit are display areas of one display device.

16. A control method for an information processing apparatus, wherein the information processing apparatus includes:
a first display unit located on an openable and closeable first surface; and
a touch screen located on a second surface, the touch screen comprising:
a second display unit on the second surface that is visible when the first display unit is open and closed,
an operation area comprising a plurality of index touch areas, and
a detection unit that detects a touch operation made in each index touch area of the plurality of index touch area on the touch screen in response to the first surface being closed and the first display unit is not visible and is turned OFF,
wherein the control method comprises:
displaying index information on each index touch area of the plurality of index touch areas on the operation area on the touch screen in response to the first surface being in a closed state, the first display unit not being visible, and the first display unit being OFF,
in response to the first surface being opened from the closed state, determining which index touch area of the plurality of index touch areas on the operation area on the touch screen is currently being touched by a user, and
in response to opening the first surface from the closed state and determining which touched index touch area is currently being touched by the user, displaying, on the first display unit, a screen configuration of a plurality of screen configurations or an application of a plurality of applications corresponding to the touched index area of an operation area of the touch screen,
wherein:
each screen configuration of the plurality of screen configurations comprises a respective first display screen associated with a use purpose and comprises one or more applications to be displayed on the first display unit, and
each application comprises a respective second display screen for display on the first display unit.

17. The method of claim 16, wherein:
a working state is associated with the index information displayed in the operation area; and
displaying, on the first display unit, a screen corresponding to an operation area in which the touch operation is performed further comprises displaying a screen configuration that is associated with the working state.

18. The method of claim 16, wherein:
the index information includes notification information; and
displaying, on the first display unit, a screen corresponding to an operation area in which the touch operation is performed further comprises displaying an application related to the notification information.

19. The method of claim 16, wherein:
the index information includes information that corresponds to an application; and
displaying, on the first display unit, a screen corresponding to an operation area in which the touch operation is performed further comprises displaying the application.

20. The method of claim 16, wherein:
the first display unit and the second display unit are display areas of one display device.

* * * * *